Patented July 31, 1923.

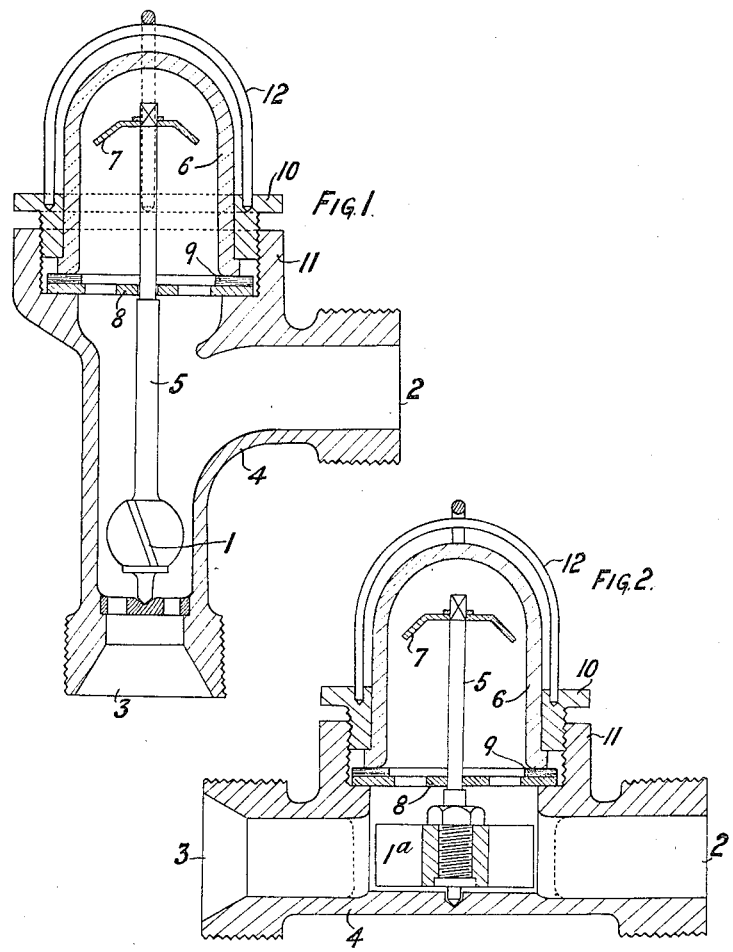

1,463,174

UNITED STATES PATENT OFFICE.

GEORGE PATERSON AND CHARLTON THEW, OF NEWCASTLE-UPON-TYNE, ENGLAND, ASSIGNORS TO R. & W. HAWTHORN, LESLIE & COMPANY, LIMITED, OF NEWCASTLE-UPON-TYNE, ENGLAND.

OIL-FLOW INDICATOR FOR GEAR-CASE SPRAYERS.

Application filed February 23, 1921. Serial No. 447,357.

*To all whom it may concern:*

Be it known that we, GEORGE PATERSON and CHARLTON THEW, both subjects of the King of the United Kingdom of Great Britain and Ireland, and residing at Newcastle-Upon-Tyne, England, have invented certain new and useful Improvement in Oil-Flow Indicators for Gear-Case Sprayers, of which the following is a specification.

This invention relates to oil indicators for gear case sprayers and has for an object to provide a device capable of easy observation which will indicate clearly to the attendant whether or not oil is passing in sufficient quantity so that the attendant may take the requisite action in the event of failure or falling off of the supply.

Another object is to provide a construction of indicator which is readily accessible for examination and is readily removable, but which will not cut off the flow of oil in the event of its getting out of position or being jammed for any reason.

Other objects and advantages will appear from the following description.

In the accompanying drawings Figs. 1 and 2 are vertical sections showing alternative constructions of indicators according to the invention. Fig. 3 is a sectional plan of the construction shown in Fig. 2.

The indicators shown each comprise a rotor constituted by a propeller 1 or paddlewheel 1ª located in the path of the oil and impelled thereby, being positioned between the oil inlet 2 and the oil outlet 3 of a pipe section 4 in the oil supply system, the rotor spindle 5 being revoluble in bearings supported by the pipe section 4 and extending out of the path of the oil to the exterior of the pipe section 4 through a lateral opening sealed by a transparent cover formed as a bell or dome 6 of glass or the like, the spindle 5 carrying at its free end within the bell or dome 6 a pointer 7 the speed of rotation of which indicates the rate of flow of the oil.

The bell or dome 6 acts as an air vessel so that the oil does not rise therein and does not obscure the glass in any way to interfere with the observation of the pointer 7 which is free to revolve with the minimum resistance.

The upper bearing or guide for the spindle 5 is formed by an apertured plate 8 between which and the lower edge of the bell or dome 6 is interposed a packing washer 9 of leather or other material, the bell or dome 6 being pressed against the washer by a gland ring 10 encircling the bell or dome 6 and threaded into a socket 11 formed on the pipe section 4.

Attached to the gland ring 10 is a wire guard 12 serving to protect the bell or dome.

Each of the rotors 1 and 1ª is so shaped and dimensioned that in no position can it completely obstruct the oil passage, a sufficient area being allowed for the flow to continue whatever be the position of the rotor.

What we claim is:—

In combination with a liquid conduit a motor casing interposed in the conduit, a closed air-dome of transparent material communicating with and jointed to said casing above the liquid flow, a motor in the casing adapted to be continuously rotated by the liquid flow, an open partition between the air-dome and the casing, a spindle for the motor having a bearing in said partition, a bearing member within the casing for the lower end of the spindle, and an indicator in the air-dome remote from the liquid flow and carried by the spindle.

In testimony whereof we have signed our names to this specification in the presence of two subscribing witnesses.

GEORGE PATERSON.
CHARLTON THEW.

Witnesses:
ISABEL ROLLO,
KATE YOTHSINGHAN.